(12) United States Patent
Tomaru

(10) Patent No.: US 11,009,997 B2
(45) Date of Patent: May 18, 2021

(54) INPUT DEVICE

(71) Applicant: DENSO CORPORATION, Kariya (JP)

(72) Inventor: Tetsuya Tomaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/895,501

(22) Filed: Jun. 8, 2020

(65) Prior Publication Data

US 2020/0301540 A1 Sep. 24, 2020

Related U.S. Application Data

(63) Continuation of application No. PCT/JP2018/040691, filed on Nov. 1, 2018.

(30) Foreign Application Priority Data

Dec. 12, 2017 (JP) .............................. JP2017-237602

(51) Int. Cl.
*G06F 3/041* (2006.01)
*G06F 3/0484* (2013.01)
(Continued)

(52) U.S. Cl.
CPC ............ *G06F 3/0418* (2013.01); *G06F 3/016* (2013.01); *G06F 3/0482* (2013.01);
(Continued)

(58) Field of Classification Search
None
See application file for complete search history.

(56) References Cited

U.S. PATENT DOCUMENTS 6,088,027 A * 7/2000 Konar ................. G06F 3/04812
715/858
9,781,356 B1 * 10/2017 Banta .................... G06F 3/0485
(Continued)

FOREIGN PATENT DOCUMENTS

| JP | 2017130021 A | 7/2017 |
|---|---|---|
| WO | WO-2019017009 A1 | 1/2019 |
| WO | WO-2019116771 A1 | 6/2019 |

OTHER PUBLICATIONS

U.S. Appl. No. 16/895,258, filed Jun. 8, 2020, Tetsuya Tomaru.
U.S. Appl. No. 16/895,746, filed Jun. 8, 2020, Tetsuya Tomaru.

*Primary Examiner* — Dorothy Harris
(74) *Attorney, Agent, or Firm* — Harness, Dickey & Pierce, P.L.C.

(57) ABSTRACT

An input device includes: a detector that detects an operation state of an operation object on an operation surface; a controller that performs input to a predetermined instrument; and a driver that vibrates the operation surface. The predetermined instrument includes a display. Multiple operation buttons and a pointer corresponding to a position of the operation object are displayed. The position of the operation object is associated with a position of each of the operation buttons and a position of the pointer by a relative coordinate. The controller causes the driver to generate a predetermined vibration on an area corresponding to an intermediate area between a first operation button and a second operation button. The controller prohibits execution of the attraction control, or corrects a movement amount of the pointer and causes the pointer to reach the second operation button from the first operation button.

4 Claims, 12 Drawing Sheets

(51) Int. Cl.
*G06F 3/0482* (2013.01)
*G06F 3/0488* (2013.01)
*G06F 3/0481* (2013.01)
*G06F 3/01* (2006.01)

(52) U.S. Cl.
CPC ...... *G06F 3/04812* (2013.01); *G06F 3/04842* (2013.01); *G06F 3/04883* (2013.01); *G06F 3/04886* (2013.01); *G06F 2203/04803* (2013.01)

(56) References Cited

U.S. PATENT DOCUMENTS

| | | | |
|---|---|---|---|
| 2012/0075086 A1* | 3/2012 | Takasu | G06F 3/016 340/407.2 |
| 2014/0327670 A1* | 11/2014 | Chen | G06T 17/00 345/420 |
| 2015/0293592 A1* | 10/2015 | Cheong | G06F 3/0416 345/173 |

* cited by examiner imperial
INPUT DEVICE

CROSS REFERENCE TO RELATED APPLICATIONS

The present application is a continuation application of International Patent Application No. PCT/JP2018/040691 filed on Nov. 1, 2018, which designated the U.S. and claims the benefit of priority from Japanese Patent Application No. 2017-237602 filed on Dec. 12, 2017. The entire disclosures of all of the above applications are incorporated herein by reference.

TECHNICAL FIELD

The present disclosure relates to an input device that enables an input operation with an operation object such as a finger, such as an operation using a touch pad or a touch panel.

BACKGROUND

In a comparative example, an input device is placed at a position different from a position of a display device. The input device includes the touch pad that detects an operation position of the finger on an operation surface, an actuator that controls a frictional force between the finger and the operation surface by vibrating the operation surface based on a detection result of the touch pad, and a controller that controls an actuation of the actuator.

SUMMARY

An input device may include: a detector that may detect an operation state of an operation object on an operation surface; a controller that may perform input to a predetermined instrument; and a driver that may vibrate the operation surface. The predetermined instrument may include a display. Multiple operation buttons and a pointer corresponding to a position of the operation object may be displayed. The position of the operation object may be associated with a position of each of the operation buttons and a position of the pointer by a relative coordinate. The controller may cause the driver to generate a predetermined vibration on an area corresponding to an intermediate area between a first operation button and a second operation button. The controller may prohibit execution of the attraction control, or correct a movement amount of the pointer and cause the pointer to reach the second operation button from the first operation button.

BRIEF DESCRIPTION OF DRAWINGS

The above and other aspects, features and advantages of the present disclosure will become more apparent from the following detailed description made with reference to the accompanying drawings. In the accompanying drawings.

DETAILED DESCRIPTION

Figure 1:
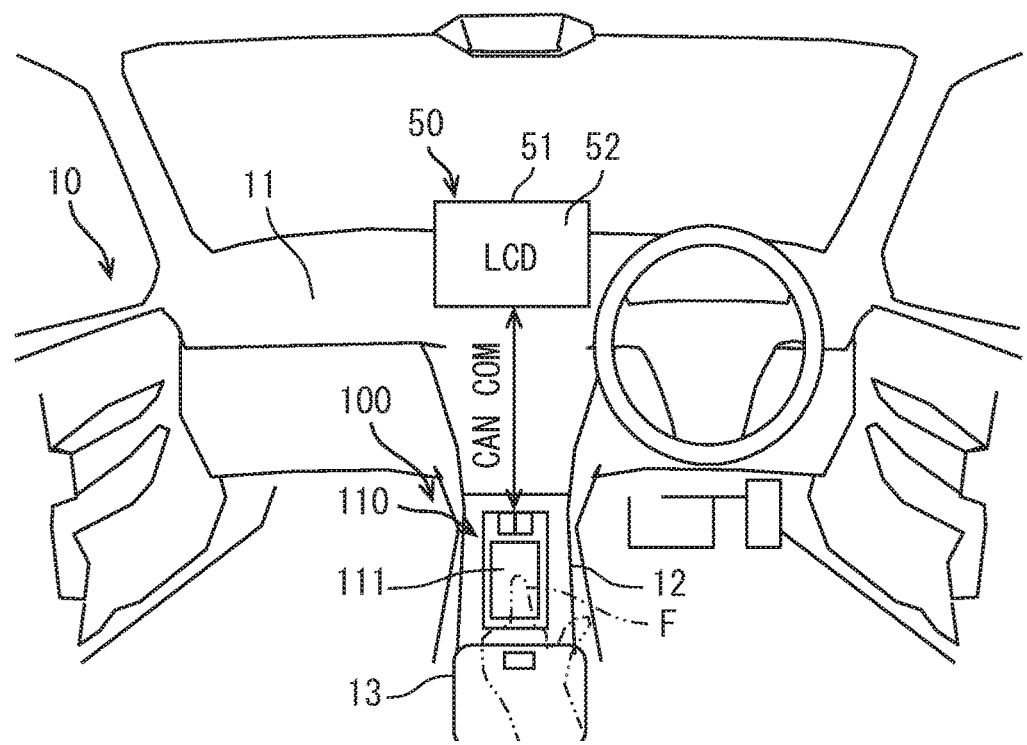
FIG. 1 is an explanatory view showing a mounting state of an input device in a vehicle.
Figure 2:
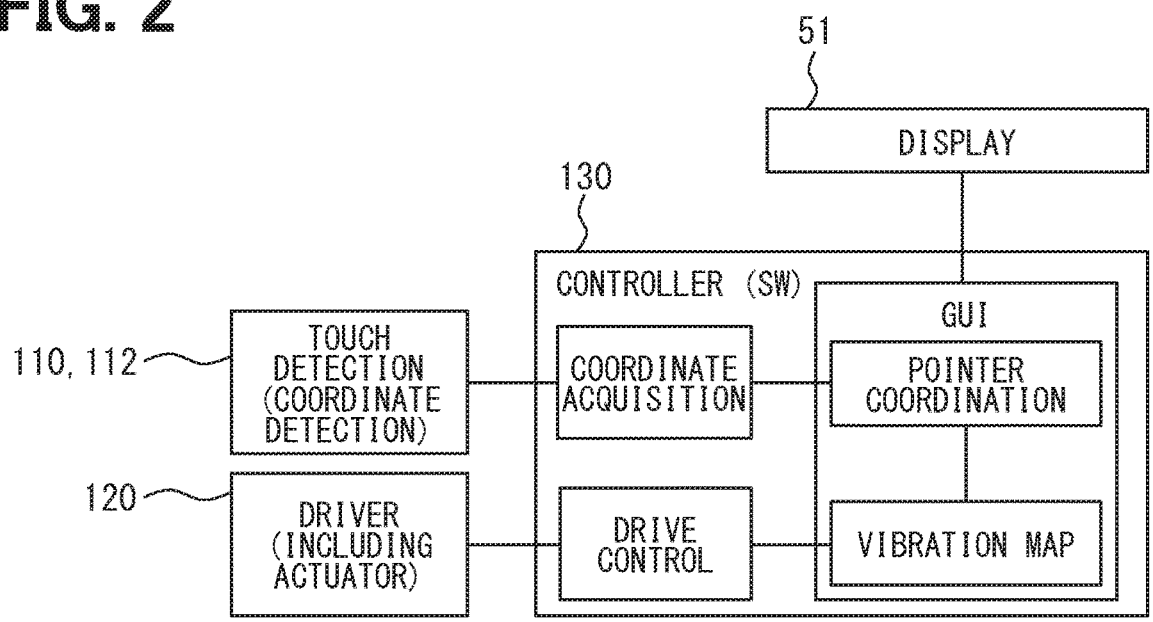
FIG. 2 is a block diagram showing the input device.

In a comparative example, an input device is placed at a position different from a position of a display device. The input device includes the touch pad that detects an operation position of the finger on an operation surface, an actuator that controls a frictional force between the finger and the operation surface by vibrating the operation surface based on a detection result of the touch pad, and a controller that controls an actuation of the actuator. The input device enables input to an icon displayed on the display device by performing a finger operation on the icon on the touch pad. The input device may be also referred to as a tactile sense presentation device. The touch pad may be also referred to as an operation detector. The actuator may be also referred to as a vibrator. The icon displayed on the display device may be also referred to as an operation button.

On the touch pad, an area corresponding to the icon of the display device is defined as a target area. An area corresponding to the periphery of the icon is defined as a peripheral area. When the finger moves on the operation surface of the touch pad from an area other than the peripheral area to the target area through the peripheral area, the controller actuates the actuator and vibration occurs in the peripheral area.

When the finger moves in the area other than the peripheral area, the vibration does not occur and a predetermined frictional force occurs to be applied to the finger. When the finger passes through the peripheral area, a squeeze effect occurs between the finger and the operation surface due to the vibration occurrence. The frictional force of the finger on the operation surface decreases. Then, a movement speed of the finger increases. Furthermore, when the finger moves in a target, the vibration does not occur, and the predetermined frictional force occurs on the finger. When an operator performs the finger operation so that the finger moves from the area other than the peripheral area to the target area through the peripheral area, the frictional force decreases in the peripheral area. A feeling of attracting the finger toward the target area occurs.

When a coordinate position on the operation surface is relatively associated with a coordinate position of the icon on the display device and when an input device performs a relative value operation in which a coordinate position in accordance with the icon is determined based on an operation start position, the following difficulties may occur.

That is, a movable distance from the operation start position on the operation surface to an outer peripheral end may not enable a coordinate on a screen to be moved to a target icon. Therefore, the coordinate may stop between the icons. When a position of the stopped finger on the operation surface is in the peripheral area, a state where the vibration is repeatedly applied continues. When the position of the finger is in an area other than the peripheral area, a state where the vibration is not applied continues. Thereby, an attraction feeling with the continuous movement of the finger is not obtained, and an incomplete state may occur.

One example of the present disclosure provides an input device that does not generate the incomplete state regarding the attraction feeling even when the relative value operation is used.

According to one example embodiment, an input device may include: a detector that may detect an operation state of an operation object on an operation surface; a controller that may perform input to a predetermined instrument in accordance with the operation state detected by the detector; and a driver that may be controlled by the controller and vibrate the operation surface. The predetermined instrument may include a display. Multiple operation buttons and a pointer corresponding to a position of the operation object on the operation surface may be displayed on the display. The position of the operation object on the operation surface may be associated with a position of each of the multiple operation buttons and a position of the pointer on the display by a relative coordinate. When determining that, due to a movement of the operation object, the pointer moves from a first operation button among the multiple operation buttons to a second operation button among the multiple operation buttons, the controller may cause the driver to generate a predetermined vibration on an area of the operation surface corresponding to an intermediate area between the first operation button and the second operation button to perform an attraction control for providing a feeling of attracting the operation object in a direction towards a position corresponding to the second operation button. In a case where the position of the operation object on the operation surface may correspond to the first operation button, when a movable distance from the position of the operation object to an outer peripheral end of the operation surface may be smaller than a distance from the first operation button to the second operation button, the controller is may prohibit execution of the attraction control or correct a movement amount of the pointer to be larger than a movement amount of the operation object on the operation surface and cause the pointer to reach the second operation button from the first operation button for performing the attraction control.

According to one example embodiment, in a case where the relative coordinate is used, when the movable distance of the operation object is smaller than a distance from any of the operation buttons to the different operation button, the pointer may stop between the operation buttons. Then, in the present disclosure, the attraction control of applying the predetermined vibration is prohibited. Accordingly, even when the pointer stops between the operation buttons, the predetermined vibration for the attraction control is not continuously applied. Therefore, it may be possible to prevent the operator from receiving a halfway sense.

According to one example embodiment, when the movable distance of the operation object is smaller than the distance from any of the operation buttons to the different operation button, the movement amount of the pointer in accordance with the movement amount of the operation object on the operation surface is corrected to be larger. Then, the correction is performed so that the pointer reaches from any of the operation buttons to the different operation button, and the attraction control is performed. Thereby, even when the movable distance is small, a state where the pointer continuously moves from any of the operation buttons to the different operation button can be formed. Therefore, it may be possible to provide the attraction feeling due to the attraction control in the middle of the movement. The incomplete state applied to operator does not occur.

First Embodiment

FIGS. 1 to 8 show an input device 100 according to a first embodiment. The input device 100 of the present embodiment is applied to, for example, a remote operation device for operating a navigation device 50. The input device 100 is mounted in a vehicle 10 with the navigation device 50. The navigation device 50 may correspond to a predetermined instrument of the present disclosure.

The navigation device 50 is a route guidance system showing current position information of the own vehicle on a map, traveling direction information, or guidance information to a destination desired by an operator, or the like. The navigation device 50 includes a liquid crystal display 51 as a display. The liquid crystal display 51 is placed in a center part of an instrument panel 11 of the vehicle 10 in a vehicle width direction. A display screen 52 is visually recognized by the operator.

The navigation device 50 is formed separately from the input device 100, and is set at a position away from the input device 100. The navigation device 50 and the input device 100 are connected by, for example, a controller area network bus (CAN bus, registered trademark).

Figure 4:
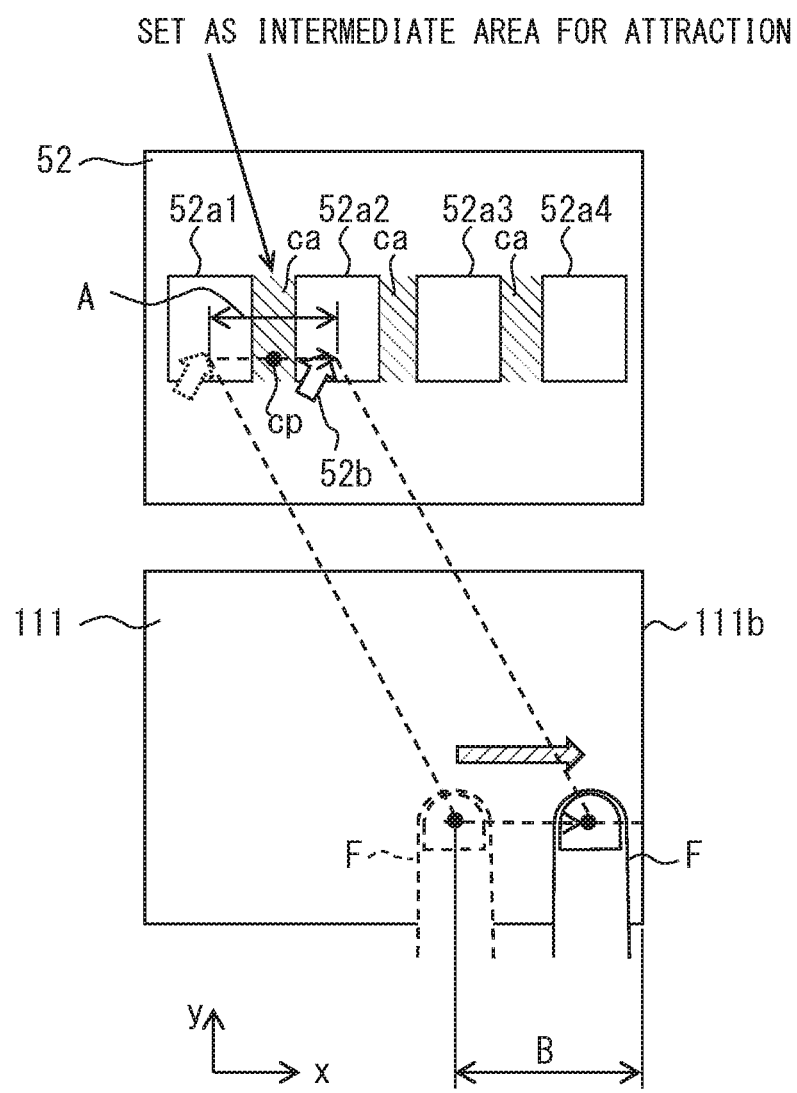
FIG. 4 is an explanatory view showing a positional relation among a finger, operation buttons, and a pointer when a movable distance of the finger is larger than a distance between the operation buttons.
Figure 8:
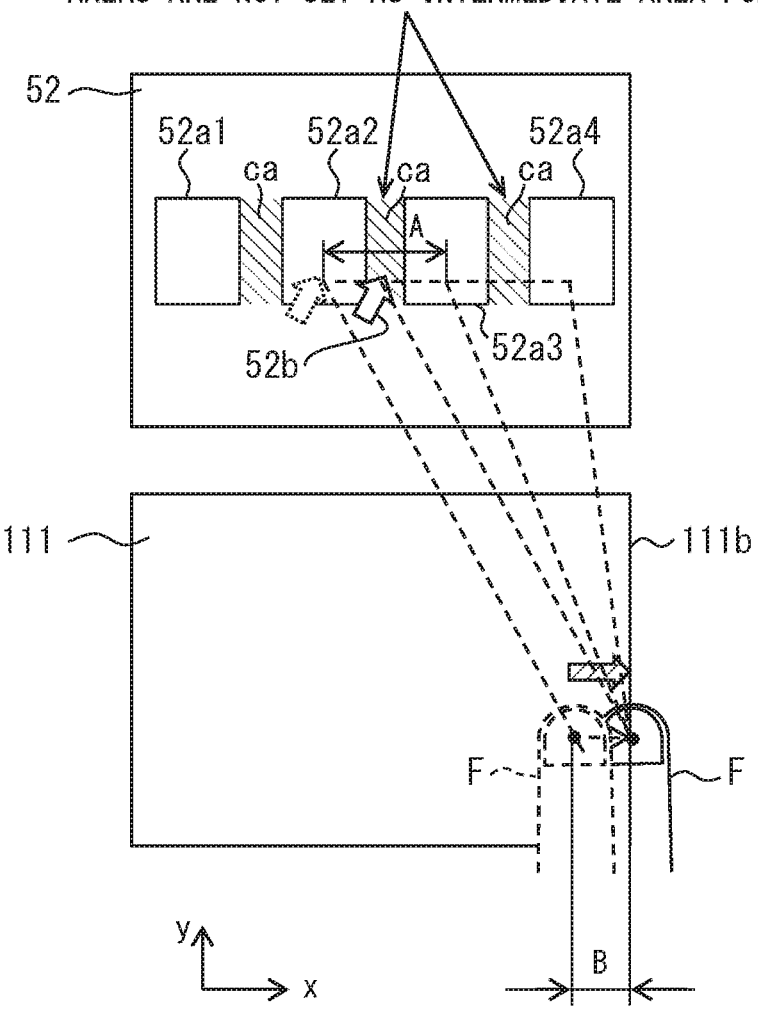
FIG. 8 is an explanatory view showing a positional relation among the finger, the operation buttons, and the pointer when the movable distance of the finger is smaller than the distance between the operation buttons.

On the display screen 52 of the liquid crystal display 51, a position of the own vehicle on the map is displayed, and various operation buttons 52a1 to 52a4 for operating the navigation device 50 are displayed (FIGS. 4 and 8). The various operation buttons 52a1 to 52a4 are, for example, buttons for an enlarged display, a reduced display, a destination guidance setting, or the like. The various operation buttons 52a1 to 52a4 are a first operation button 52a1, a second operation button 52a2, a third operation button 52a3, and a fourth operation button 52a4, or the like. The various operation buttons 52a1 to 52a4 may be so-called operation icons, and correspond to multiple operation buttons of the present disclosure. In the display screen 52, for example, a pointer 52b designed in an arrow shape is displayed so as to correspond to a position of a finger F (operation object) of the operator on an operation portion 110 (more specifically, operation surface 111). The finger F of the operator may correspond to one example of the operation object of the present disclosure. The operation surface 111 corresponds to a surface on an operation side of the operation portion.

In the display screen 52, each area between various operation buttons 52a1 to 52a4 is defined as an intermediate area ca. Furthermore, a predetermined position (for example, a center position or an arbitrary position in the middle) in the intermediate area ca is defined as an intermediate position cp. The distance between the various operation buttons 52a1 to 52a4 is defined as an inter-button distance A. The inter-button distance A is, for example, a distance between centers of the various operation buttons 52a1 to 52a4. The inter-button distance A may correspond to a "distance from a first operation button among the multiple operation buttons to a second operation button among the multiple operation buttons" of the present disclosure.

In the present embodiment, a coordinate position (operation coordinate position) of the finger F on the operation surface 111, coordinate positions (display coordinate positions) of various operation buttons 52a1 to 52a4 on the liquid crystal display 51, and a coordinate position of the pointer 52b are associated by a relative coordinate. A relative position operation is performed. For example, based on a position firstly touched by the finger F on the operation surface 111 for a finger operation, the pointer 52b displayed then is associated. The position of the pointer 52b with respect to the various operation buttons 52a1 to 52a4 is set in accordance with the movement direction of the finger F and the movement distance.

As shown in FIGS. 1 to 4, the input device 100 is placed at a position adjacent to an armrest 13 in a center console 12 of the vehicle 10. The input device 100 is placed in a range that is easily reached by a hand of the operator. The input device 100 includes the operation portion 110, a driver 120, and a controller 130, or the like.

The operation portion 110 forms a so-called touch pad, and serves as a portion for performing the input operation on the navigation device 50 with the finger F of the operator. The operation portion 110 includes the operation surface 111, a touch sensor 112, and a housing 113 or the like.

The operation surface 111 is exposed to the operator side at the position adjacent to the armrest 13, and is a plane portion on which the operator performs the finger operation. For example, the operation surface 111 is formed by placing a material that improves finger sliding over the entire surface or the like.

On the operation surface 111, it is set so that input for an operation (selection, pressing decision, or the like) to the various operation buttons 52a1 to 52a4 displayed on the display screen 52 can be performed by the finger operation of the operator. In peripheral of the operation surface 111, a rib 111a extending to a side opposite to the operation side is placed.

The touch sensor 112 is, for example, a capacitance type detector placed on a back side of the operation surface 111. The touch sensor 112 is formed in a rectangular flat plate shape, and detects an operation state of the finger F of the operator on a sensor surface. The touch sensor 112 may correspond to one example of a detector of the present disclosure.

The touch sensor 112 is formed by arranging an electrode extending along an x-axis direction on the operation surface 111 and an electrode extending along a y-axis direction in a grid shape. These electrodes are connected to the controller 130. A generated capacitance of each electrode changes in accordance with the position of the operator finger F approaching the sensor surface. A signal (sensitivity value) of the generated capacitance is output to the controller 130. The sensor surface is covered with an insulation sheet made of an insulation material. The touch sensor 112 is not limited to the capacitance type. Various types such as a pressure sensitive type can be employed.

The housing 113 is a support portion that supports the operation surface 111 and the touch sensor 112. The housing 113 is formed in a frame shape, and, for example, is placed inside the center console 12.

The driver 120 vibrates the operation surface 111 in a surface direction of the operation surface 111, that is, directions of two axes including the x-axis and the y-axis of the operation surface 111. The driver 120 is placed between a rib 111a and the housing 113 at one or more sides. The driver 120 is connected to the controller 130. The controller 130 controls vibration generation.

The driver 120 enables vibration in only one axis direction of the two axis directions, and thereby generates the vibration in one axis direction (x-axis direction or y-axis direction) on the operation surface 111. The driver 120 enables the vibrations in two axis directions, and can generate the vibration on the operation surface 111 in an oblique direction obtained by combining the two vibrations.

Figure 3A:
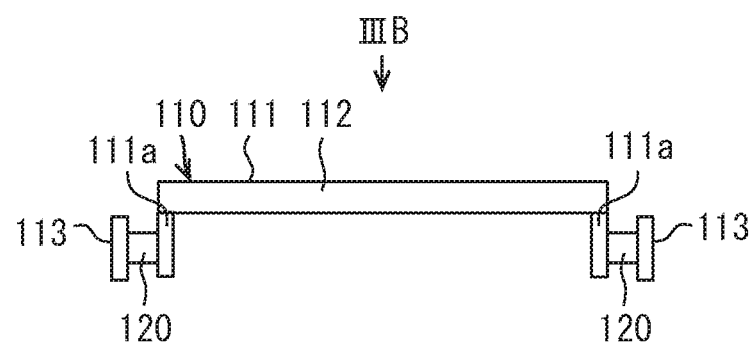
FIG. 3A is a side view showing an operation portion and a driver in a first embodiment.
Figure 3B:
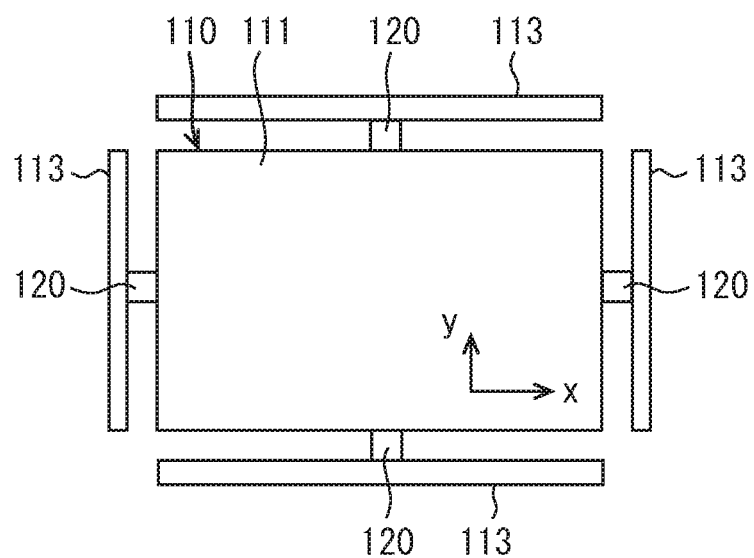
FIG. 3B is a plane view viewed from a direction of an arrow IIIB of FIG. 3A.

As the driver 120, for example, an electromagnetic actuator such as a solenoid or a voice coil motor, a vibrator such as a piezo or a combination of the vibrator or a spring or the like can be employed. For example, when one vibrator generates the vibrations in two axis directions, the driver 120 can be formed by at least placing the one vibrator at one side among the four sides corresponding to the circumference of the operation surface 111. Alternatively, when the vibrator generates the vibration in only one direction, the driver 120 can be formed by arranging the vibrator (two vibrators in total) at each of two sides adjacent to each other corresponding to the circumference of the operation surface 111. Alternatively, when the combination of the vibrator in one direction and the spring is placed at each of two sides, the driver 120 can be formed by placing two sets of the combinations so that the vibration directions intersect. In the present embodiment, as shown in FIGS. 3A and 3B, the driver 120 corresponds to the vibrators placed at the four sides corresponding to the circumference of the operation surface 111.

The controller 130 includes a CPU, a RAM, and a storage medium, or the like. Based on a signal obtained from the touch sensor 112, the controller 130 acquires, as the operation state of the finger F of the operator, a contact position (a contact coordinate) of the finger F on the operation surface 111, a movement direction, and a movement distance or the like. At this time, the controller 130 associates the firstly acquired contact position of the finger F with the position of the pointer 52b displayed then, and displays the pointer 52b on the display screen 52 so that the pointer 52b moves in accordance with the movement of the finger F (performs the relative value operation). The pointer 52b is displayed so as to move on the various operation buttons 52a1 to 52a4 on the display screen 52.

The controller 130 controls the generation state of the vibration by the driver 120 in accordance with these operation states. A vibration control parameter (vibration map) when the vibration is controlled is stored in the storage medium of the controller 130 in advance. The controller 130 controls the vibration based on this vibration control parameter.

The configuration of the input device 100 according to the present embodiment is as described above, and the actuation and effect will be described below with reference to FIGS. 5 to 8.

Figure 5:
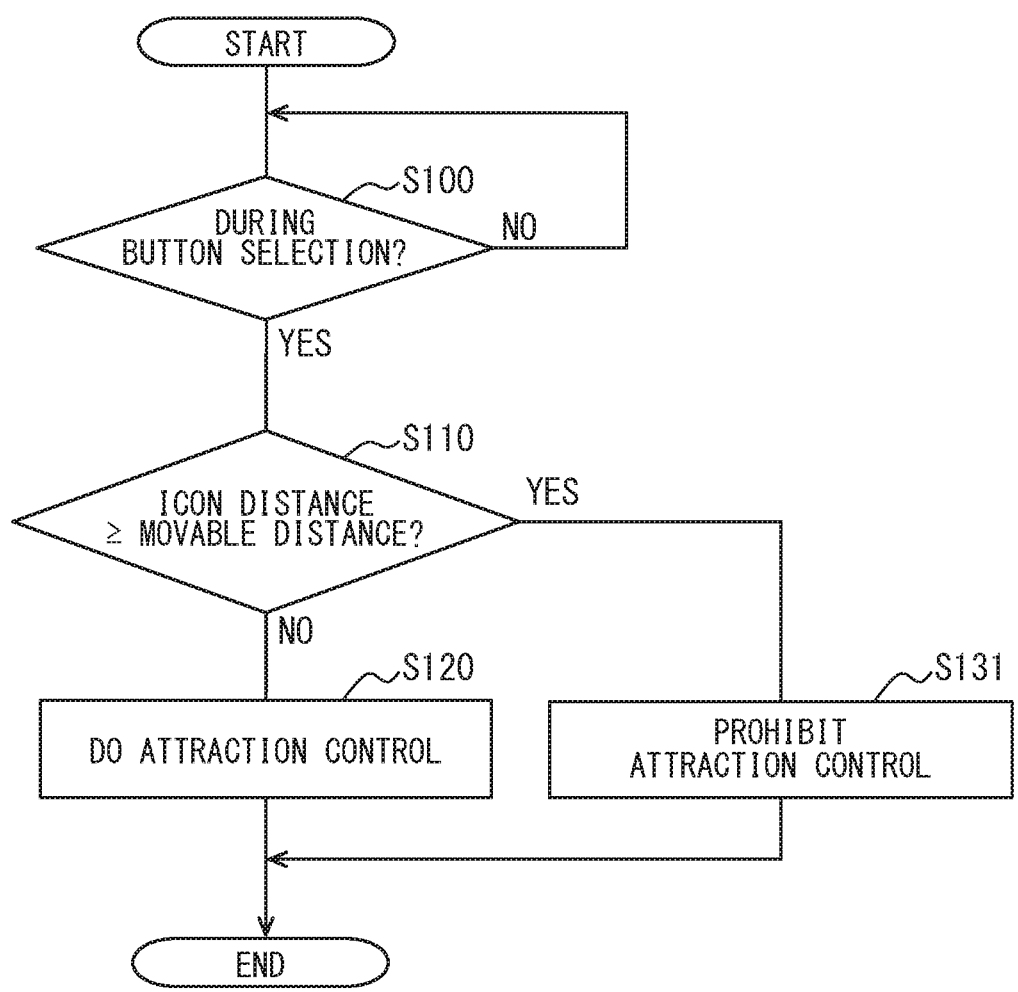
FIG. 5 is a flowchart showing a control content in the first embodiment.

The controller 130 performs a control of attracting (pulling) the finger F to the operation button as the movement destination or a control of prohibiting the attraction based on a flowchart of FIG. 5. FIGS. 4 and 8 show one model. In the one model, when the operator selects the various operation buttons 52a1 to 52a4, the finger F moves from the first operation button 52a1 to the second operation button 52a2, and furthermore moves from the second operation button 52a2 to the third operation button 52a3.

In S100, the controller 130 determines whether the finger F of the operator is selecting any of the operation buttons (52a1 to 52a4) based on the signal (operation state of the finger F) obtained from the touch sensor 112. That is, the controller 130 determines whether the pointer 52b is on any of the operation buttons (52a1 to 52a4). When determining that the determination is negative in S100, the controller 130 repeats the process in S100. When the controller 130 determines that the determination is positive, the process shifts to S110. A state when the determination is positive is, for example, a state where the pointer 52b (shown by broken line) is positioned on the first operation button 52a1 in FIG. 4A.

In S110, the controller 130 determines whether a movable distance B from the finger F to an outer peripheral end 111b of the operation surface 111 in a movement direction is equal to or smaller than an inter-button distance A from the first operation button 52a1 to the adjacent second operation button 52a2. In a case where the determination is negative in S110, that is, the movable distance B is larger than the inter-button distance A, a positional relation as shown in FIG. 4 is obtained. In the positional relation, when the finger F moves on the operation surface 111, the pointer 52b can move from the first operation button 52a1 to the second operation button 52a2.

When the determination is negative in S110, the controller 130 generates the vibration on the operation surface 111 by using the normal vibration map, and performs the attraction control for attracting the finger F from the first operation button 52a1 to the second operation button 52a2 in S120.

That is, the controller 130 causes the driver 120 to generate the vibration that is a stationary wave in a direction in accordance with the movement destination of the finger F on the operation surface 111 when the pointer 52b is positioned in the intermediate area ca. Here, the various operation buttons 52a1 to 52a4 are set to be arranged in the x-axis direction, and therefore the vector direction (movement direction) of the finger F is the x-axis direction. The controller 130 generates the vibration along the x-axis direction.

Figure 6:
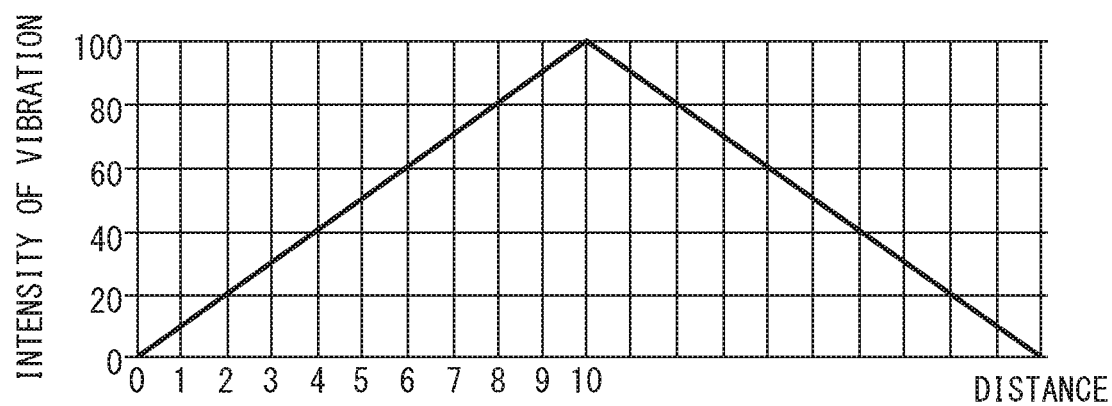
FIG. 6 is a graph showing an intensity of vibration when the finger is attracted in the first embodiment.

As shown in FIG. 6, the controller 130 performs the control so that an intensity of the vibration is a maximum value at the middle point (corresponding to the intermediate position cp) of the intermediate area ca, in accordance with the movement position of the finger F (pointer 52b). The controller 130 changes the intensity linearly when the intensity of the vibration is changed to the maximum value.

FIG. 4 shows a case where the intermediate position cp in the intermediate area ca is set to the center position of the intermediate area ca for better understanding. The intermediate position cp is not limited to the center position of the intermediate area ca, and may be any position in the intermediate area ca.

Figure 7:
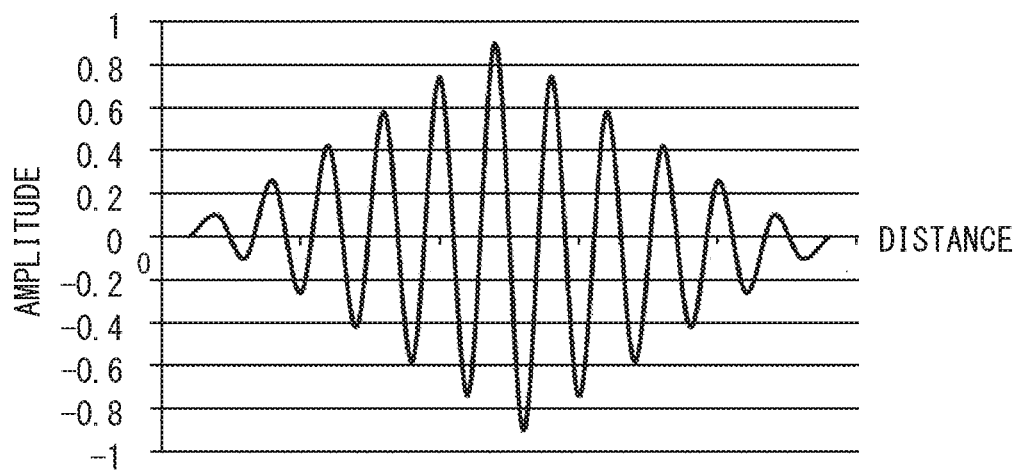
FIG. 7 is a graph showing a vibration waveform when the finger is attracted in the first embodiment.

As shown in FIG. 7, the controller 130 changes an amplitude for changing the intensity of the vibration to the maximum value. Specifically, while the finger F (pointer 52b) moves from the first operation button 52a1 to the intermediate position cp, the amplitude is sequentially increased in accordance with the movement position. Thereby, the intensity of the vibration is increased. The controller 130 maximizes the amplitude at the intermediate position cp. After the finger F passes the intermediate position cp, the amplitude is sequentially decreased to be returned to the original amplitude in accordance with the movement position. Thereby, the intensity of the amplitude is decreased. The change of the amplitude forms an apparent peak (mountain) and an apparent bottom (valley) of resistance on the operation surface 111. The finger F is operated (moved) as if the finger F is passing over this peak.

Due to the process in S120, when the finger F moves from the first operation button 52a1 to the second operation button 52a2, the finger F receives the resistance caused by the vibration generated on the operation surface 111. In addition, as the finger F moves from the first operation button 52a1 to a position corresponding to the intermediate position cp, the intensity of the vibration is controlled to be the maximum value. Therefore, the resistance received by the finger F increases. As the finger F moves from the intermediate position cp to a position corresponding to the second operation button 52a2, the intensity of the vibration is controlled to decrease after reaching the maximum value. Therefore, the resistance received by the finger F decreases.

The finger F reaches the position corresponding to the second operation button 52a2 over the maximum resistance at the intermediate position cp. The finger F receives a sensation (effect) as if being guided (attracted) from the intermediate position cp to the position corresponding to the second operation button 52a2. Then, the feeling of guidance may be also referred to as a feeling of passing over the peak (mountain).

In the present embodiment, when the operator moves the finger F, the finger F is guided in the movement direction, and the feeling of being guided to the movement destination is obtained.

On the other hand, when the determination is positive in S110, the controller 130 shifts to the process in S131. The case where the determination is positive in S110 is a case as shown in FIG. 8. That is, when, by the movement of the finger F on the operation surface 111, the pointer 52b is intended to be moved from the second operation button 52a2 to the third operation button 52a3 (or the fourth operation button 52a4), the movable distance B of the finger F is equal to or smaller than the inter-button distance A. Accordingly, even when, on the operation surface 111, the finger F is maximally moved to the outer peripheral end 111b, the pointer 52b enters (stagnates) the intermediate area ca, and cannot reach the third operation button 52a3 (further, the fourth operation button 52a4).

Accordingly, in this case, when the normal attraction control is performed, a state where the vibration having the amplitude corresponding to the position of the finger F (pointer 52b) in the intermediate area ca is repeatedly applied continues. The attraction feeling cannot be applied to the operator, and the incomplete state may occur.

In S131, the vibration map in which the generation of the vibration in the intermediate area ca is deleted is used. That is, the vibration for the attraction in the intermediate area ca is not generated. In other words, in S131, the attraction control is prohibited.

As described above, according to the present embodiment, in the input device 100 using the relative coordinate, the pointer 52b stops between the operation buttons when the movable distance B of the finger F is smaller than the inter-button distance A from any of the operation buttons to the different operation button. Then, the attraction control of applying the predetermined vibration is prohibited. Accordingly, even when the pointer 52b stops between the operation buttons, the predetermined vibration for the attraction control is not continuously applied. Therefore, it may be possible to prevent the operator from receiving a halfway (incomplete) sense.

Modification of First Embodiment

Figure 9:
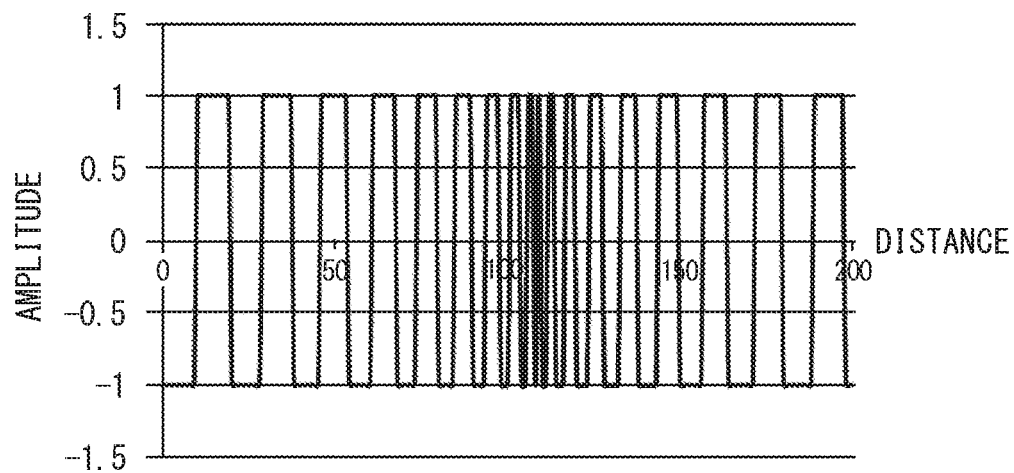
FIG. 9 is a graph showing the vibration waveform in a modification 1 of the first embodiment.
Figure 10:
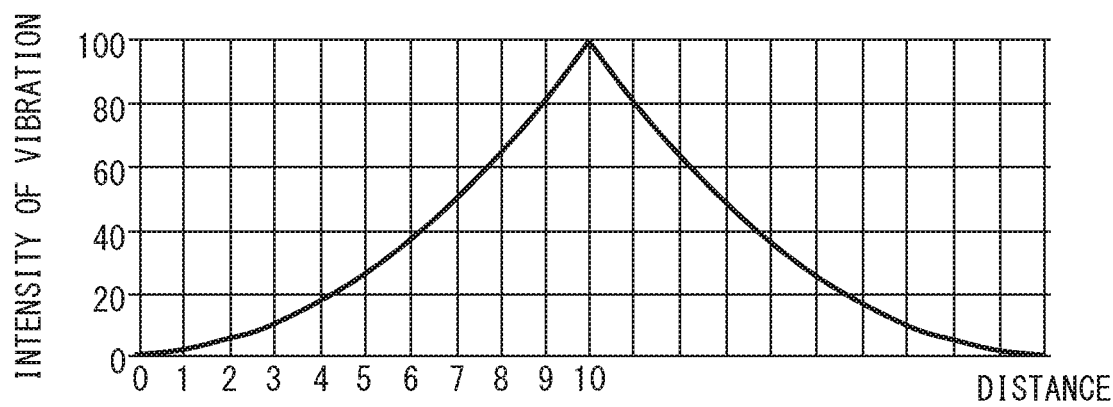
FIG. 10 is a graph showing the intensity of the vibration in a modification 2 of the first embodiment.

FIGS. 9 and 10 show a modification of the first embodiment. Here, as shown in FIG. 9, the controller 130 changes a frequency of the vibration with the same amplitude for controlling the intensity of the vibration to be the maximum value. Specifically, while the finger F (pointer 52b) moves from the first operation button 52a1 to the intermediate position cp, the frequency of the vibration is sequentially increased. Thereby, the intensity of the vibration is increased. The frequency is maximized at the intermediate position cp. After the finger F (pointer 52b) passes the intermediate position cp, the frequency of the vibration is decreased to be returned to the original frequency. Thereby, the intensity of the vibration is decreased.

As shown in FIG. 10, when maximizing the intensity of the vibration, the controller 130 may change the intensity exponentially. According to Weber-Fechner law, since the amount of human sensation is proportional to a logarithm of a stimulus intensity. Therefore, the exponential change enables humans to more easily understand.

Second Embodiment

Figure 11:
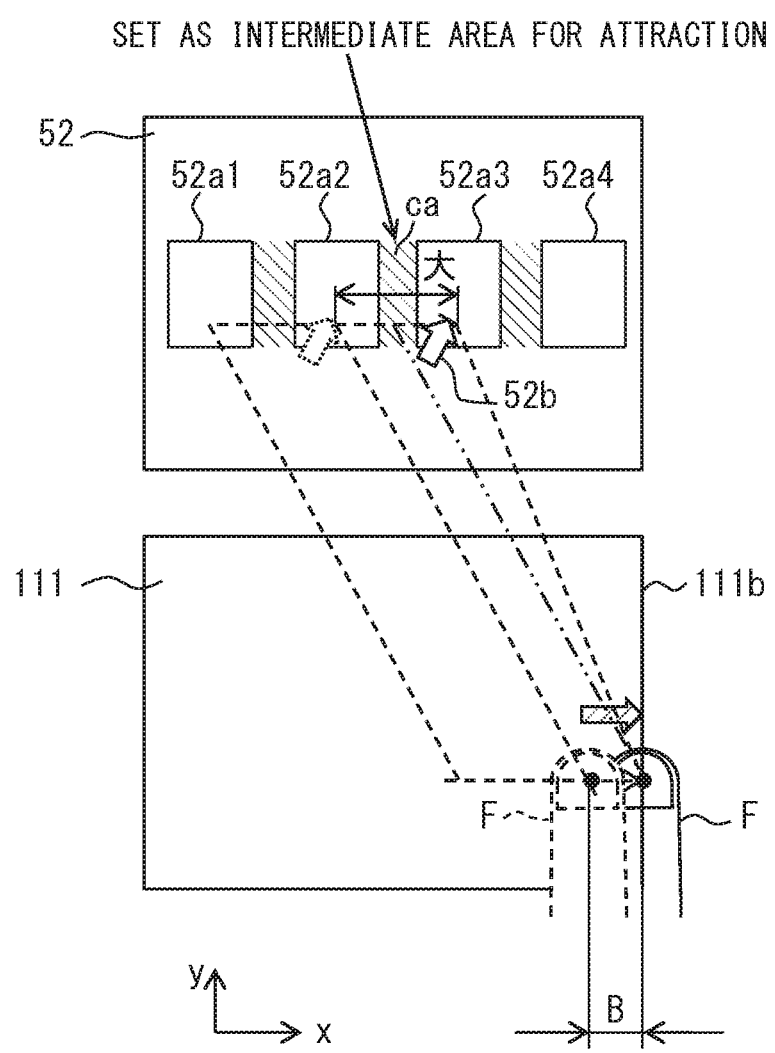
FIG. 11 is an explanatory diagram showing a positional relation among the finger, the operation buttons, and the pointer in a second embodiment.
Figure 12:
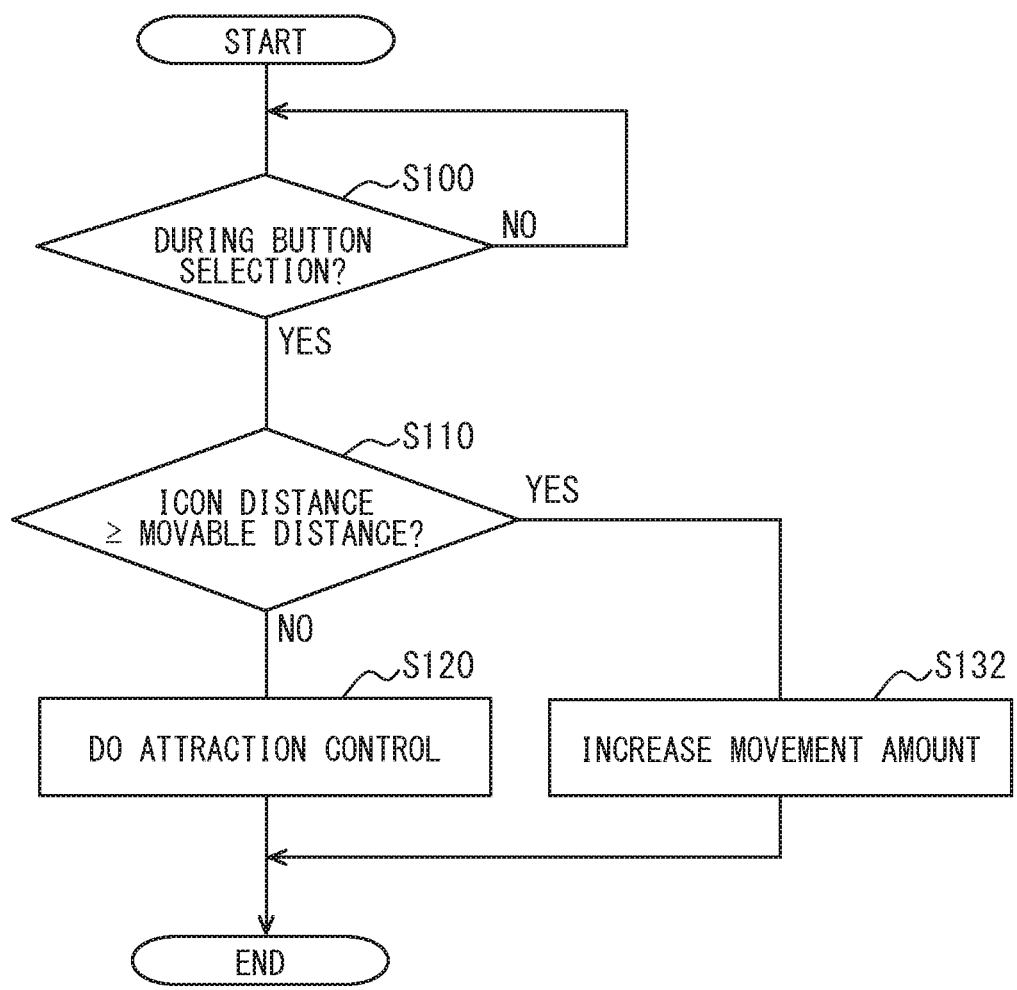
FIG. 12 is a flowchart showing a control content in the second embodiment.

FIGS. 11 and 12 show a third embodiment. A configuration of the second embodiment is same as the configuration of the first embodiment. The second embodiment is different from the first embodiment in the process in the case where the movable distance B of the finger F is equal to or smaller than the inter-button distance A. In the present embodiment, the controller 130 corrects (performs coordinate conversion) the movement amount of the pointer 52b to be larger than the movement amount of the finger F on the operation surface 111. The controller 130 moves the pointer 52b from any of the operation buttons (52a2) to the different operation button (52a3). Thereby, the controller 130 performs the attraction control.

FIG. 12 is a flowchart showing a control content in the second embodiment. The process in S131 of the first embodiment (FIG. 5) is changed to the process in S132.

When the determination is positive in S110, the controller 130 performs the correction (coordinate conversion) by changing the movement amount of the pointer 52b towards the nearby operation button (52a3) to be larger than the movement amount of the finger F so that the pointer 52b reaches the nearby operation button (52a3) in S132. The controller 130 uses the normal vibration map, and, similarly to S120, generates the vibration on the operation surface 111 in the intermediate area ca to perform the attraction control.

As described above, in the present embodiment, when the movable distance B of the finger F is smaller than the inter-button distance A from any of the operation buttons (52a2) to the different operation button (52a3), the movement amount of the pointer 52b is corrected to be larger than the movement amount of the finger F on the operation surface 111. Then, the correction is performed so that the pointer 52b reaches from any of the operation buttons 52a2 to the different operation button (52a3), and the attraction control is performed. Thereby, even when the movable distance B is small, the state where the pointer 52b continuously moves from any of the operation buttons (52a2) to the different operation button (52a3) can be formed. Therefore, it may be possible to provide the attraction feeling due to the attraction control in the middle of the movement. The incomplete state applied to operator does not occur.

Third Embodiment

Figure 13:
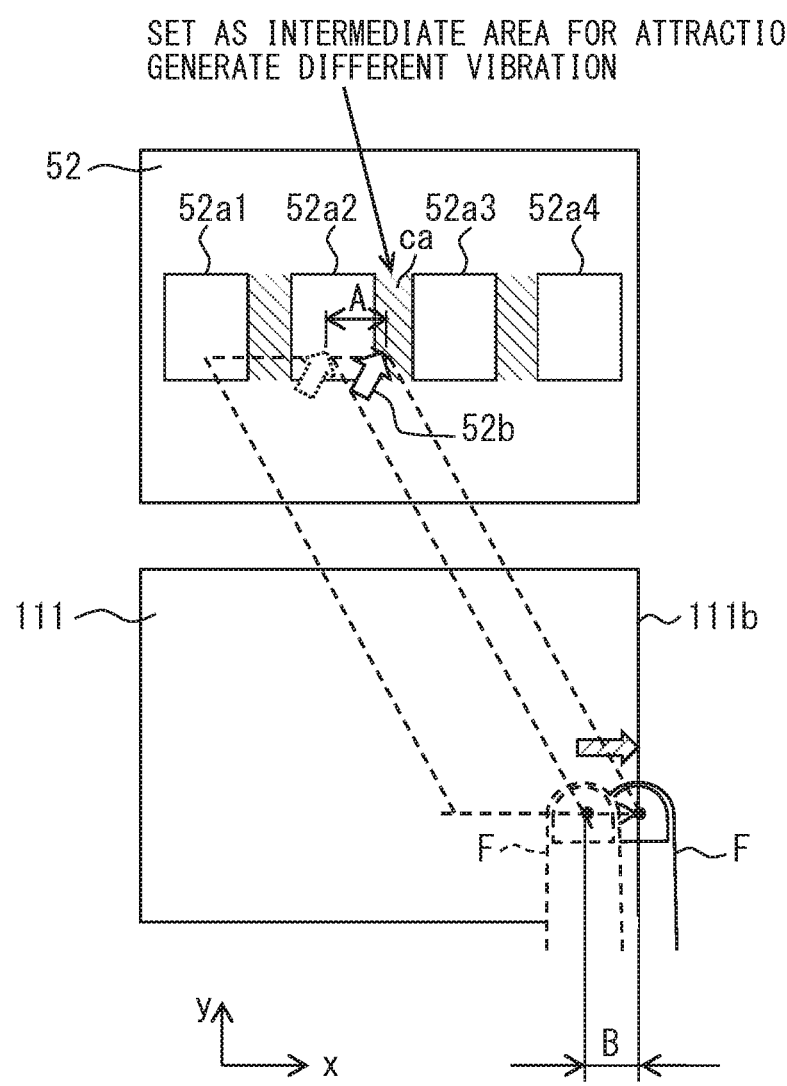
FIG. 13 is an explanatory diagram showing a positional relation among the finger, the operation buttons, and the pointer in a third embodiment.
Figure 14:
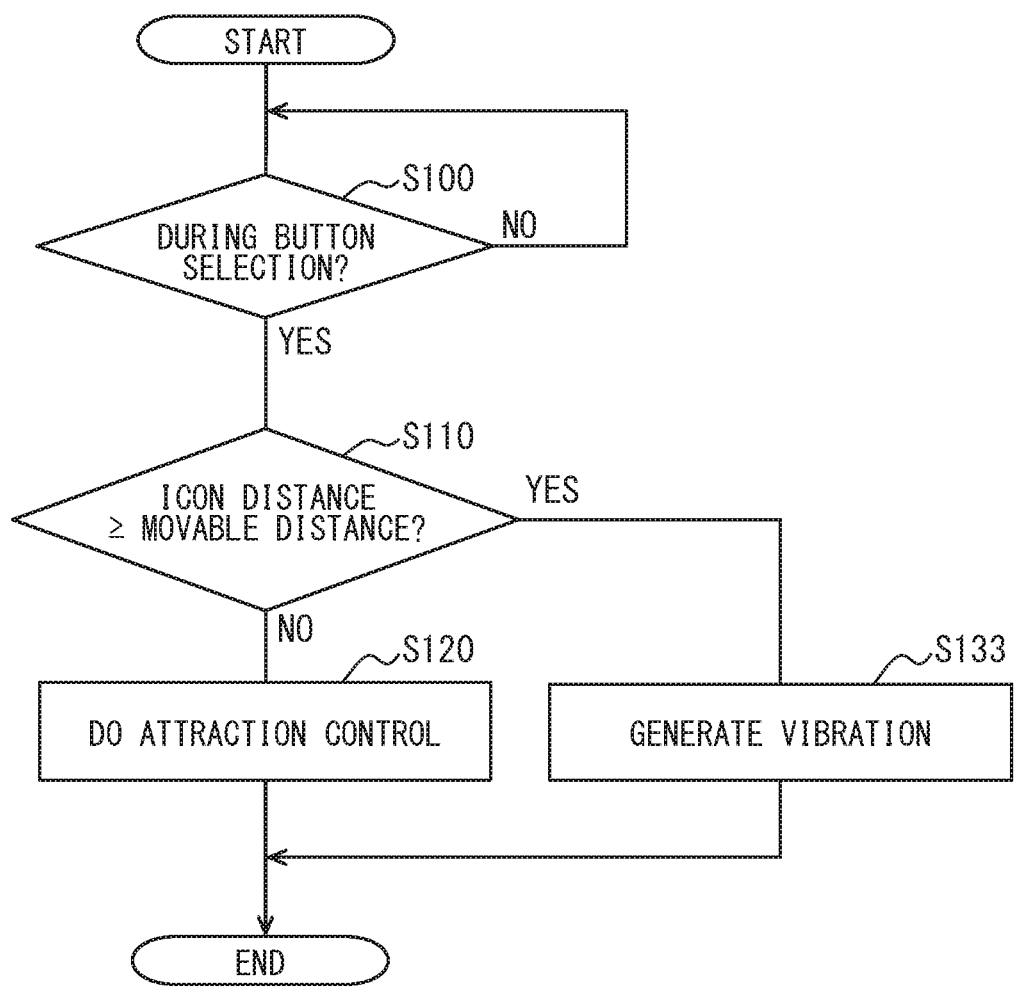
FIG. 14 is a flowchart showing a control content in the third embodiment.

FIGS. 13 and 14 show a third embodiment. A configuration of the third embodiment is same as the configuration of the first embodiment. The third embodiment is different from the first embodiment in the process in the case where the movable distance B of the finger F is equal to or smaller than the inter-button distance A. In the present embodiment, when prohibiting the execution of the attraction control, the controller 130 causes the driver 120 to generate a warning vibration on the operation surface 111. The warning vibration is different from the predetermined vibration for the attraction.

FIG. 14 is a flowchart showing a control content in the third embodiment. The processes in S131 of the first embodiment (FIG. 5) is changed to the process in S133.

When the determination is positive in S110, the controller 130 prohibits the execution of the attraction control in S133, that is, does not cause the driver 120 to generate the attraction vibration, and causes the driver 120 to generate the warning vibration on the operation surface 111. The warning vibration may be, for example, obtained by generating a single vibration at predetermined time intervals, or the like.

Thereby, it may be possible to cause the operator to clearly recognize that the finger F reaches the outer peripheral end 111b of the operation surface 111 and the pointer 52b cannot reach the adjacent operation button (52a3). Accordingly, it may be possible to restart the finger operation from a position where the finger F can quickly move without causing the incomplete state regarding the attraction on the operator.

Fourth Embodiment

Figure 15A:
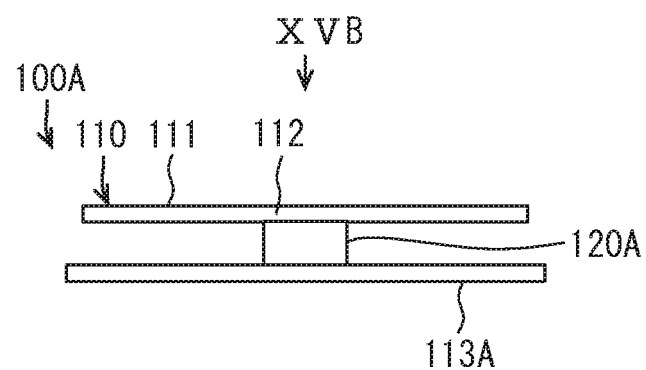
FIG. 15A is a side view showing an operation portion and a driver in a fourth embodiment.
Figure 15B:
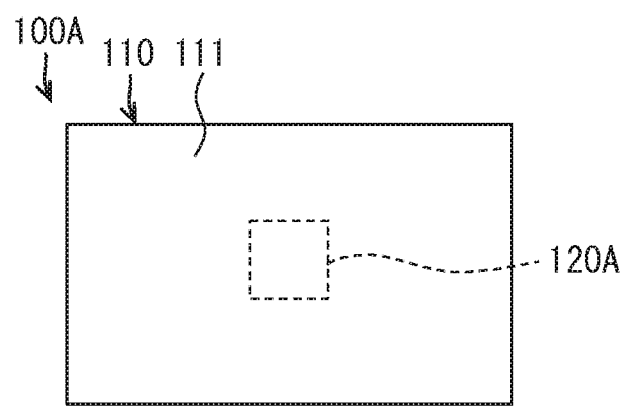
FIG. 15B is a plane view viewed from a direction of an arrow XVB of FIG. 15A.

FIGS. 15A and 15B show an input device 100A according to a fourth embodiment. The fourth embodiment is different from the first embodiment in that the setting positions of the housing 113 and the driver 120 are changed. Instead of the housing 113 and the driver 120, the fourth embodiment includes a housing 113A and a driver 120A.

The housing 113A is formed in a plate shape, and is arranged on the back side of the operation surface 111. The driver 120A is arranged on the back side of the operation surface 111. The driver 120A is positioned between the back surface of the operation surface 111 and the housing 113A. For example, the driver 120A generates the vibrations in two axes directions corresponding to the x-axis and the y-axis. The driver 120A is placed on a central part of the back surface of the operation surface 111. As the driver 120A, for example, the electromagnetic actuator such as the voice coil motor capable of generating the vibrations in the two axis directions is used, as described in the first embodiment. The number of drivers 120A is not limited to one, and multiple drivers 120A may be used.

In the present embodiment, the basic actuation is same as that of the first embodiment. It may be possible to obtain the similar effects.

Other Embodiments

In each embodiment, in the case where the controller 130 prohibits the execution of the attraction control, even when the finger F has moved, the position coordinate of the pointer 52b may be fixed to the position coordinate of the operation button (corresponding to a first operation button among the multiple operation buttons of the present disclosure) at the start of the movement. In other words, the pointer 52b may not be moved. Thereby, even when the finger operation restarts since the movable distance B of the finger F is small, the original operation button shown by the pointer 52b is not changed and the operation is easily continued.

In each embodiment, it is described that the vibration control parameter (vibration map) set in advance may be used for controlling the intensity of the vibration. However, it is not limited to this. In accordance with the operation state of the finger F, the vibration pattern may be obtained by calculation for each state.

In each embodiment, when the attraction control is performed, the vibration in the direction where the finger F moves is generated along the operation surface 111. Alternatively, the vibration in the direction intersecting with the operation surface 111 is generated, and the attraction feeling may be provided by using the squeeze effect.

In each embodiment, the operation portion 110 is the so-called touch pad type. However, it is not limited to this. The so-called touch panel type in which the display screen 52 of the liquid crystal display 51 is transparent and the display is visually recognized in the operation surface 111 may be applicable.

In each embodiment, it is described that the operation object is the finger F of the operator. However, it is not limited to this. A stick imitating a pen may be employed.

In each embodiment, an input control target (predetermined instrument) by the input device 100 or 100A is the navigation device 50. However, it is not limited to this. A different instrument such as an air conditioner for the vehicle or an audio device for the vehicle may be applicable.

The controller and the method described in the present disclosure may be implemented by a special purpose computer configuring a processor programmed to perform one or more functions embodied by a computer program. Alternatively, the controller and the method described in the present disclosure may be implemented by a special purpose computer configured as a processor with a special purpose hardware logic circuits. Alternatively, the controller and the method described in the present disclosure may be implemented by one or more dedicated computers configured by a combination of a processor executing a computer program and one or more hardware logic circuits. The computer programs may be stored, as instructions being executed by a computer, in a non-transitory tangible computer-readable storage medium.

It is noted that a flowchart or the process of the flowchart in the present application includes multiple steps (also referred to as sections), each of which is represented, for instance, as S100. Further, each step can be divided into several sub-steps while several steps can be combined into a single step.

In the above, the embodiments, the configurations, the aspects of the input device according to the present disclosure are exemplified. However, the present disclosure is not limited to every embodiment, every configuration and every aspect related to the present disclosure. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:
1. An input device comprising:
a detector configured to detect an operation state of an operation object on an operation surface;
a controller configured to perform input to a predetermined instrument in accordance with the operation state detected by the detector; and
a driver configured to be controlled by the controller and vibrate the operation surface,
wherein:
the predetermined instrument includes a display;
a plurality of operation buttons and a pointer corresponding to a position of the operation object on the operation surface are displayed on the display;
the position of the operation object on the operation surface is associated with a position of each of the plurality of operation buttons and a position of the pointer on the display by a relative coordinate;
when determining that, due to a movement of the operation object, the pointer moves from a first operation button among the plurality of operation buttons to a second operation button among the plurality of operation buttons, the controller is configured to cause the driver to generate a predetermined vibration on an area of the operation surface corresponding to an intermediate area between the first operation button and the second operation button to perform an attraction control for providing a feeling of attracting the operation object in a direction towards a position corresponding to the second operation button; and
in a case where the position of the operation object on the operation surface corresponds to the first operation button, when a movable distance from the position of the operation object to an outer peripheral end of the operation surface is smaller than a distance from the first operation button to the second operation button, the controller is configured to
prohibit execution of the attraction control or
correct a movement amount of the pointer to be larger than a movement amount of the operation object on the operation surface and cause the pointer to reach the second operation button from the first operation button for performing the attraction control.

2. The input device according to claim 1, wherein:
when prohibiting the execution of the attraction control, the controller is configured to cause the driver to generate a warning vibration on the operation surface; and
the warning vibration is different from the predetermined vibration.

3. The input device according to claim 1, wherein:
when the controller is configured to prohibit the execution of the attraction control and when the operation object moves, the controller is configured to fix a position coordinate of the pointer to a position coordinate of the first operation button.

4. An input device comprising:
a sensor configured to detect an operation state of an operation object on an operation surface;
a controller that includes
one or more processors; and
a memory coupled to the one or more processors and storing program instructions that when executed by the one or more processors cause the one or more processors to at least:
perform input to a predetermined instrument in accordance with the operation state detected by the sensor; and an actuator configured to be controlled by the controller and vibrate the operation surface, wherein:

the predetermined instrument includes a display;

a plurality of operation buttons and a pointer corresponding to a position of the operation object on the operation surface are displayed on the display;

the position of the operation object on the operation surface is associated with a position of each of the plurality of operation buttons and a position of the pointer on the display by a relative coordinate;

when determining that, due to a movement of the operation object, the pointer moves from a first operation button among the plurality of operation buttons to a second operation button among the plurality of operation buttons, the controller is configured to cause the actuator to generate a predetermined vibration on an area of the operation surface corresponding to an intermediate area between the first operation button and the second operation button to perform an attraction control for providing a feeling of attracting the operation object in a direction towards a position corresponding to the second operation button; and in a case where the position of the operation object on the operation surface corresponds to the first operation button, when a movable distance from the position of the operation object to an outer peripheral end of the operation surface is smaller than a distance from the first operation button to the second operation button, the controller is configured to prohibit execution of the attraction control or correct a movement amount of the pointer to be larger than a movement amount of the operation object on the operation surface and cause the pointer to reach the second operation button from the first operation button for performing the attraction control.

* * * * *